(12) United States Patent
Palmer et al.

(10) Patent No.: US 10,217,183 B2
(45) Date of Patent: Feb. 26, 2019

(54) SYSTEM, METHOD, AND COMPUTER PROGRAM PRODUCT FOR SIMULTANEOUS EXECUTION OF COMPUTE AND GRAPHICS WORKLOADS

(71) Applicant: NVIDIA Corporation, Santa Clara, CA (US)

(72) Inventors: Gregory S. Palmer, Cedar Park, TX (US); Jerome F. Duluk, Jr., Palo Alto, CA (US); Karim Maher Abdalla, Menlo Park, CA (US); Jonathon S. Evans, Santa Clara, CA (US); Adam Clark Weitkemper, Holly Springs, NC (US); Lacky Vasant Shah, Los Altos Hills, CA (US); Philip Browning Johnson, Santa Clara, CA (US); Gentaro Hirota, San Francisco, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 960 days.

(21) Appl. No.: 14/137,818

(22) Filed: Dec. 20, 2013

(65) Prior Publication Data
US 2015/0178879 A1 Jun. 25, 2015

(51) Int. Cl.
*G06T 1/20* (2006.01)
*G06F 9/50* (2006.01)

(52) U.S. Cl.
CPC ............... *G06T 1/20* (2013.01); *G06F 9/505* (2013.01)

(58) Field of Classification Search
CPC ......... G06T 1/20; G06F 9/5066; G06F 9/544; G06F 17/30578
See application file for complete search history.

(56) References Cited

U.S. PATENT DOCUMENTS

| | | | |
|---|---|---|---|
| 2007/0294666 A1* | 12/2007 | Papakipos | G06F 8/20 717/119 |
| 2011/0249010 A1* | 10/2011 | Lonkar | G06T 1/20 345/506 |
| 2011/0298787 A1* | 12/2011 | Feies | G06T 13/20 345/419 |
| 2015/0116342 A1* | 4/2015 | Haase | G06T 1/60 345/555 |

* cited by examiner

*Primary Examiner* — Weiming He
(74) *Attorney, Agent, or Firm* — Zilka-Kotab, P.C.

(57) ABSTRACT

A system, method, and computer program product are provided for allocating processor resources to process compute workloads and graphics workloads substantially simultaneously. The method includes the steps of allocating a plurality of processing units to process tasks associated with a graphics pipeline, receiving a request to allocate at least one processing unit in the plurality of processing units to process tasks associated with a compute pipeline, and reallocating the at least one processing unit to process tasks associated with the compute pipeline.

19 Claims, 12 Drawing Sheets

SYSTEM, METHOD, AND COMPUTER PROGRAM PRODUCT FOR SIMULTANEOUS EXECUTION OF COMPUTE AND GRAPHICS WORKLOADS

FIELD OF THE INVENTION

The present invention relates to processor resources, and more particularly to dynamic selection of processor resources to process compute and graphics workloads simultaneously.

BACKGROUND

Conventional central processing units (CPUs) are configured with a small number of cores that are allocated to perform operations for different processes using a time slice technique. For example, Intel® Core iX (e.g., i3, i5, i7) processors may include up to 4 cores with each core having resources for two threads to be loaded into the hardware resources at a time (e.g., each core includes two sets of program counters). During each clock cycle, each core may execute an instruction from either of the two threads currently loaded in the hardware resources for the core. An operating system may also make scheduling decisions that enable a thread stored in memory to be loaded into the hardware resources of the core, potentially evicting a currently loaded thread and storing that thread into memory to be restored at a later point in time.

In contrast to the conventional CPUs, graphics processing units (GPUs) are implemented with a large number of cores arranged in a highly parallel architecture. These circuits are typically specialized to process large blocks of data in parallel, especially graphics data. Conventional GPUs are typically configured to process a large number of threads related to a particular context. The GPU may be allocated to a graphics context where all of the GPU resources are configured to process a large number of threads related to graphics data. Alternately, the GPU may be allocated to a different context, such as a compute context, where all of the GPU resources are configured to process a large number of threads related to compute data. As used herein, a graphics context comprises the state related to executing instructions on the GPU for the processing of graphics data such as rendering 3D model data to generate 2D image data, processing textures, generating soft shadows, etc. A compute context comprises the state related to executing instructions on the GPU to perform general parallel computations such as physics calculations used in animations or large data set analysis. Conventional GPUs can be configured to process either a graphics context or a compute context, but not both, and the operating system can switch the GPU from one context to another dynamically during execution in order to process graphics tasks or compute tasks.

Recently, some parallel processor architectures have been implemented as hybrid systems. In other words, the parallel processor includes a number of cores, a first portion of which is allocated to process compute tasks and a second portion of which is allocated to process graphics tasks. However, this allocation is fixed such that all of the resources of the parallel processor cannot be allocated to either compute tasks or graphics tasks, and, when only one type of task is being executed, at least one portion of the parallel processor is idle. Such a system is not efficient at handling any type of context that needs to be processed.

Thus there is a need for addressing these issues and/or other issues associated with the prior art.

SUMMARY

A system, method, and computer program product are provided for allocating processor resources to process compute workloads and graphics workloads substantially simultaneously. The method includes the steps of allocating a plurality of processing units to process tasks associated with a graphics pipeline, receiving a request to allocate at least one processing unit in the plurality of processing units to process tasks associated with a compute pipeline, and reallocating the at least one processing unit to process tasks associated with the compute pipeline.

DETAILED DESCRIPTION

A technique for dynamic allocation of processing units within a parallel processor is described. Dynamic allocation of processing units enables a graphics pipeline and a compute pipeline to be dynamically scaled in response to an amount of work being received for the two pipelines. The system is designed to reduce inefficiencies with prior art systems that processed graphics and compute workloads substantially simultaneously either using a fixed allocation of processor resources, relative to a single processor context, or used time-multiplexing techniques to switch processor contexts to process compute workloads and graphics workloads serially. In the case of a fixed allocation in a single processor context, there are inefficiencies created when the ratio of the work received by the processor is not equal to the ratio of the processor resources allocated to the respective processing pipelines. In the case of time-multiplexed context switching, there are inefficiencies created based on latency for context switching or the nature of the compute work, which may not be easily parallelized.

Dynamic allocation of processor resources to a graphics pipeline and a compute pipeline within a single processor context (thereby avoiding unnecessary context switching that could require long latency memory stores and loads) enables the processor resources to be scaled to match the work received by the processor from multiple channels.

Figure 1:
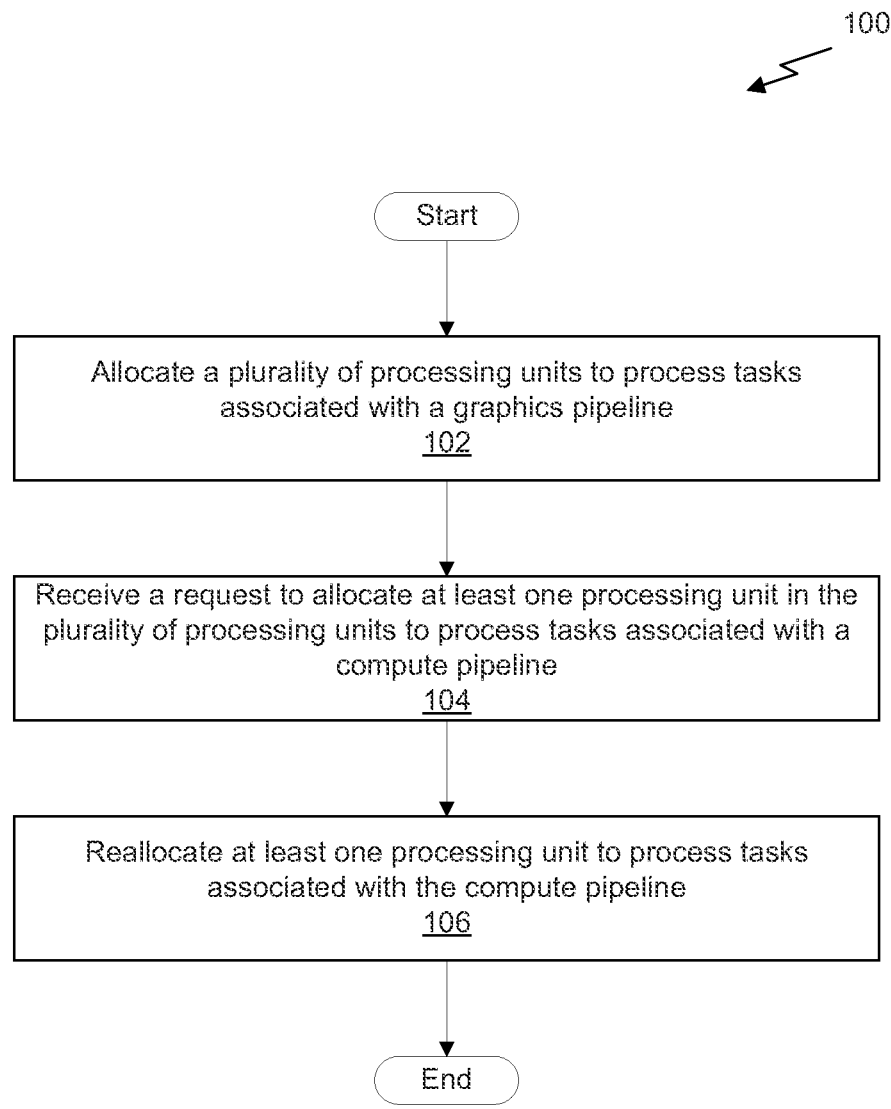
FIG. 1 illustrates a flowchart of a method for simultaneous execution of compute and graphics tasks, in accordance with one embodiment.

FIG. 1 illustrates a flowchart of a method 100 for simultaneous execution of compute and graphics tasks, in accordance with one embodiment. At step 102, a plurality of processing units is allocated to process tasks associated with a graphics pipeline. The plurality of processing units may comprise all available processing units included in a parallel processor having a number of processing units. In the context of the present description, a graphics pipeline is an abstract set of stages for processing graphics data; each stage of the graphics pipeline may be implemented using one or more processing units. The processing units may be fixed function hardware units, programmable streaming processors, or some combination thereof. In one embodiment, a graphics pipeline may include, but is not limited to, a vertex shader stage, a geometry shader stage, a tessellation shader stage, and a fragment/pixel shader stage, where each stage is implemented on one or more programmable streaming multiprocessors.

At step 104, a request to allocate at least one processing unit in the plurality of processing units to process tasks associated with a compute pipeline is received. In the context of the present description, a compute pipeline is an abstract set of stages for processing data that is not directly related to shading pixels in an image; each stage of the compute pipeline may be implemented using one or more processing units. For example, the compute pipeline may be utilized to compute physics calculations associated with a model for generating an animation. In another example, the compute pipeline may be utilized to analyze large data sets such as in the financial field or scientific field.

In one embodiment, the request may specify a number of processing units that should be allocated to the compute pipeline. The request may request all of the processing units of the parallel processor be allocated to the compute pipeline or merely a subset of the processing units of the parallel processor be allocated to the compute pipeline. At step 106, at least one processing unit is reallocated to process tasks associated with the compute pipeline. In one embodiment, the parallel processor may be configured to drain any pending graphics work from at least a portion of the graphics pipeline prior to reallocating the at least one processing unit to process tasks associated with the compute pipeline.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
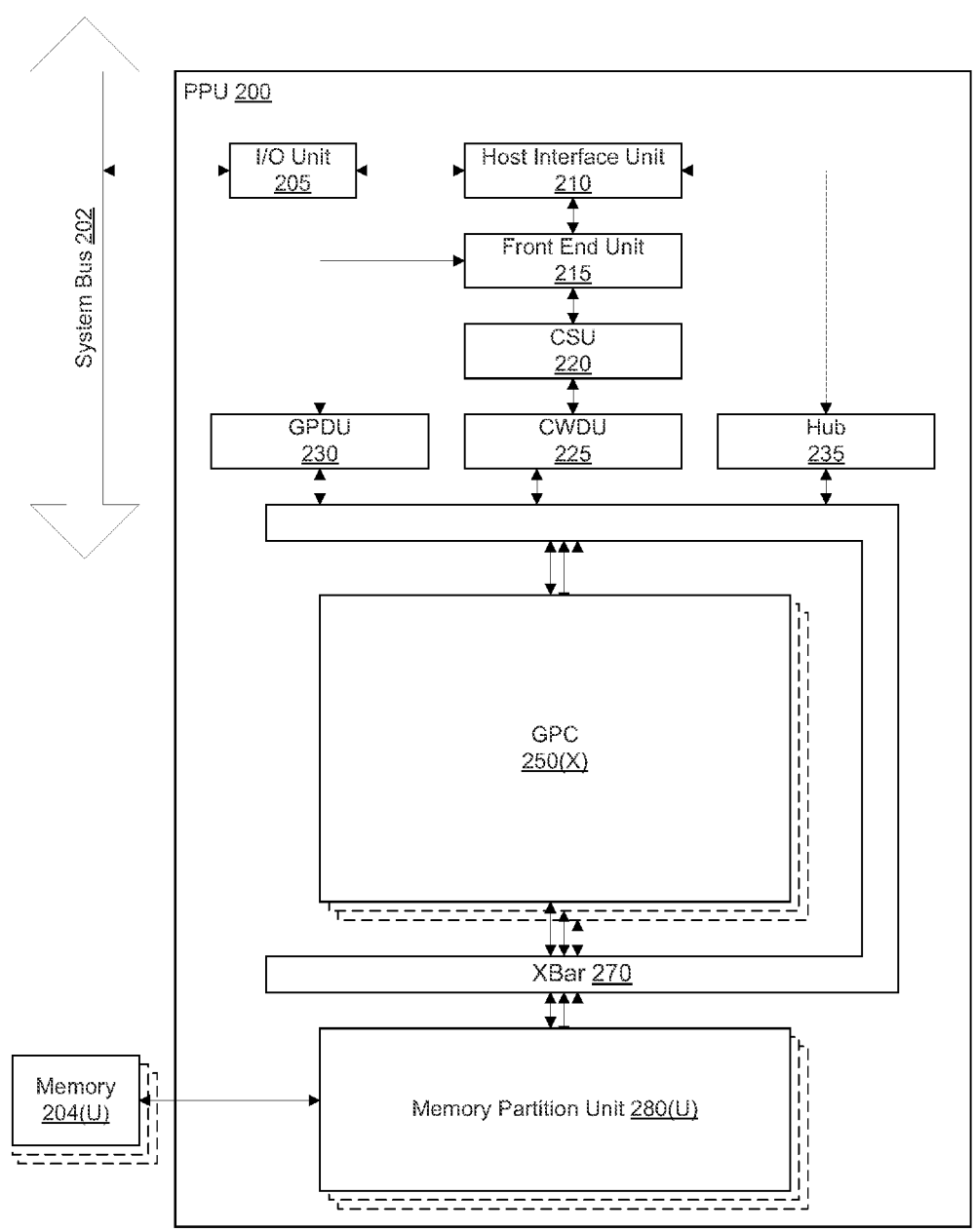
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a compute scheduler unit (CSU) 220, a compute work distribution unit (CWDU) 225, a graphics primitive distribution unit (GPDU) 230, a hub 235, a crossbar (Xbar) 270, one or more general processing clusters (GPCs) 250, and one or more memory partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and pointers to data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 manages the scheduling of instructions from one or more command streams written by the host processor (i.e., channels) on the various sub-units of the PPU 200.

The front end unit 215 receives instructions from the host interface unit 210 from one or more command streams and forwards those instructions to the correct sub-unit of the PPU 200. Instructions associated with a compute pipeline may be received by the front end unit 215. These compute instructions are then forwarded to a compute scheduler unit 220. The compute scheduler unit 220 is configured to track state information related to the various tasks managed by the compute scheduler unit 220. The state may indicate which GPC 250 a task is assigned to, whether the task is active or inactive, a priority level associated with the task, and so forth. The compute scheduler unit 220 manages the execution of a plurality of tasks on the one or more GPCs 250.

The compute scheduler unit 220 is coupled to a compute work distribution unit 225 that is configured to dispatch tasks for execution on the GPCs 250. The compute work distribution unit 225 may track a number of scheduled tasks received from the compute scheduler unit 220. In one embodiment, the compute work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

Returning to the front end unit 215, instructions associated with a graphics pipeline may be received by the front end unit 215. These graphics instructions are then forwarded to a graphics primitive distribution unit 230. The graphics primitive distribution unit 230 fetches vertex data from the memory 204 or the system memory via the system bus 202 for various graphics primitives. Graphics primitives may include points, lines, triangles, quads, triangle strips, and the like. The graphics primitive distribution unit 230 groups the vertices into batches of primitives and dispatches tasks to the GPCs 250 for processing the batches of primitives. Processing may involve executing a shader (i.e., a vertex Shader, Tesselation Shader, Geometry Shader, etc.) on a programmable processing unit as well as performing fixed function operations on the vertices such as clipping, culling, and viewport transformation using a fixed function unit.

The compute work distribution unit 225 and the graphics primitive distribution unit 230 communicate with the one or more GPCs 250 via a XBar 270. The XBar 270 is an interconnect network that couples many of the units of the PPU 200 to other units of the PPU 200. For example, the XBar 270 may be configured to couple the compute work distribution unit 225 to a particular GPC 250. Although not shown explicitly, one or more other units of the PPU 200 are coupled to the host unit 210. The other units may also be connected to the XBar 270 via a hub 235.

The tasks associated with the compute pipeline are managed by the compute scheduler unit 220 and dispatched to a GPC 250 by the compute work distribution unit 225. The tasks associated with the graphics pipeline are managed and distributed to a GPC 250 by the graphics primitive distribution unit 230. The GPC 250 is configured to process the tasks and generate results. The results may be consumed by other tasks within the GPC 250, routed to a different GPC 250 via the XBar 270, or stored in the memory 204. The results can be written to the memory 204 via the memory partition units 280, which implement a memory interface for reading and writing data to/from the memory 204. In one embodiment, the PPU 200 includes a number U of memory partition units 280 that is equal to the number of separate and distinct memory devices 204 coupled to the PPU 200. A memory partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
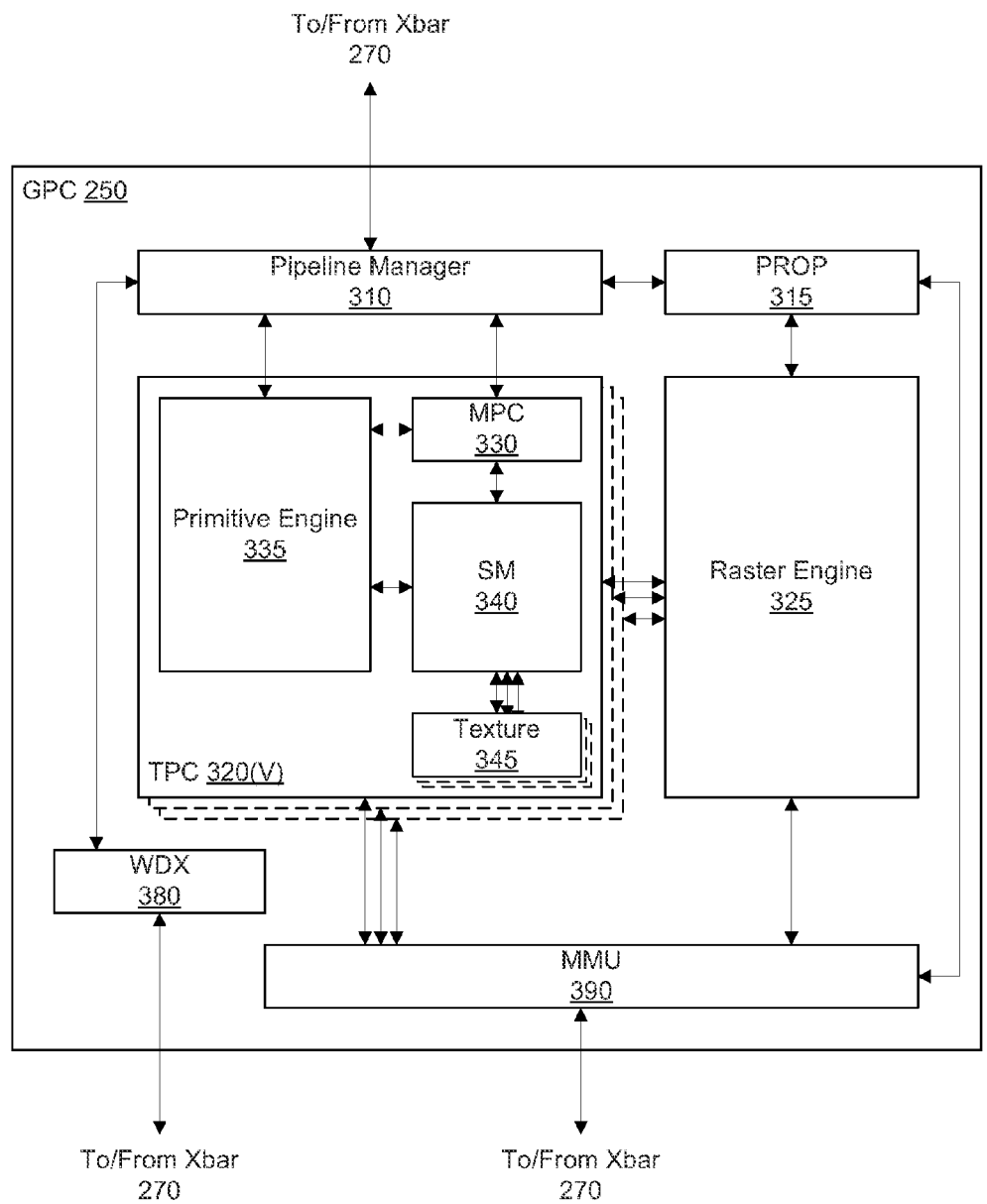
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the Xbar 270 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the memory partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the memory partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
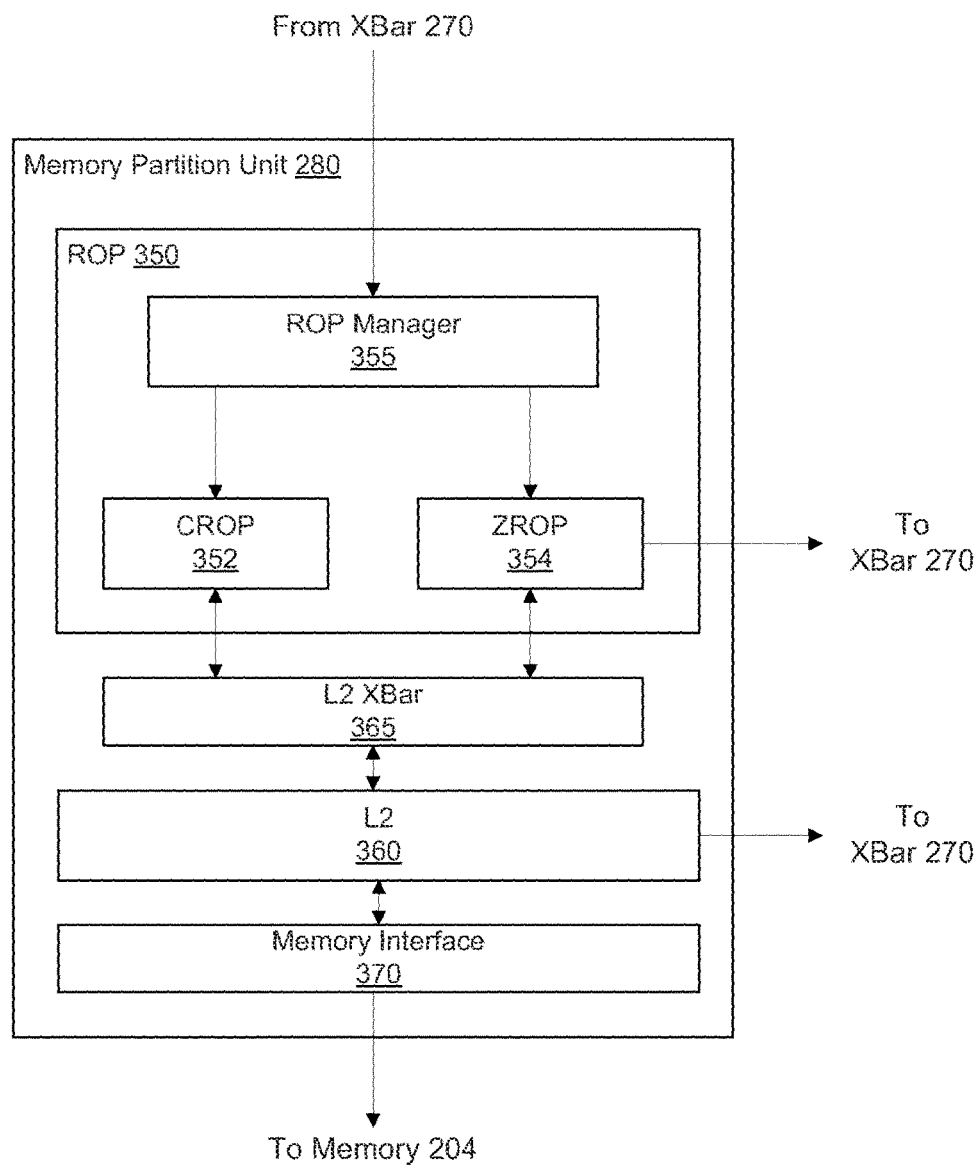
FIG. 3B illustrates a partition unit of the parallel processing unit of FIG. 2, in accordance with one embodiment.

FIG. 3B illustrates a memory partition unit 280 of the PPU 200 of FIG. 2, in accordance with one embodiment. As shown in FIG. 3B, the memory partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per memory partition unit 280, where each memory partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of memory partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
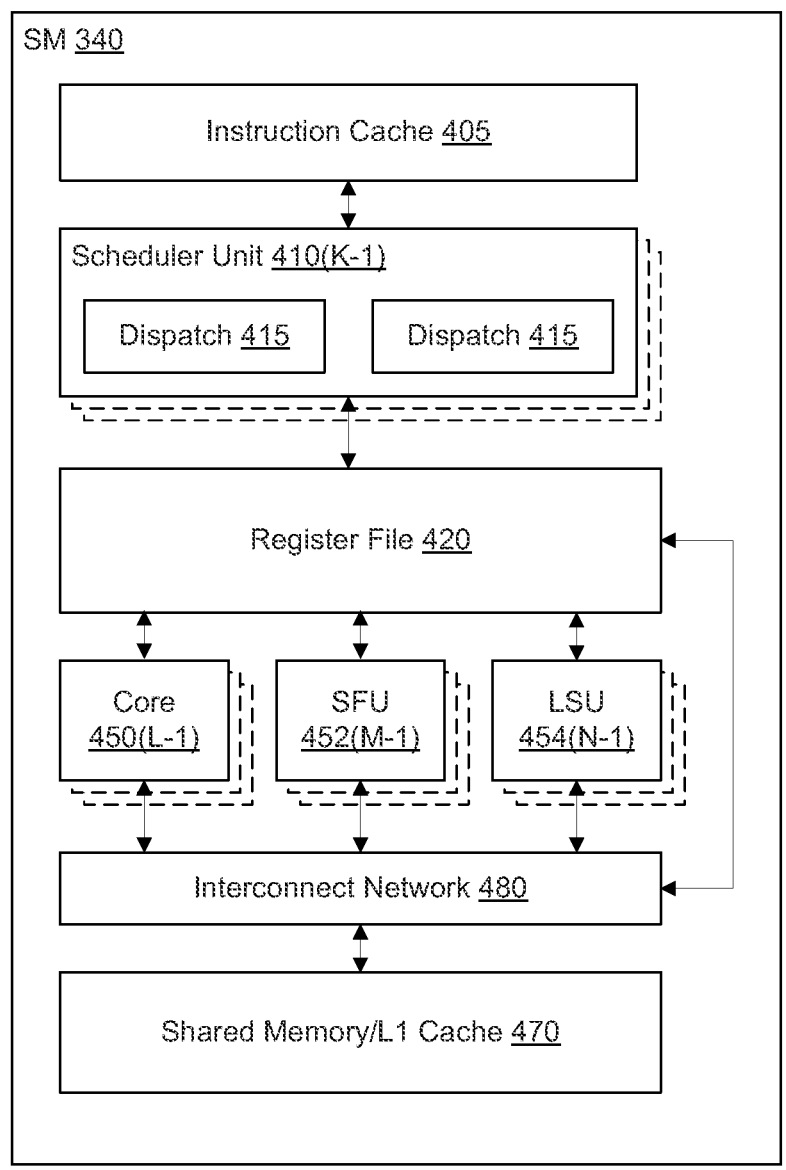
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the compute work distribution unit 225 and the graphics primitive distribution unit 230 dispatch tasks for execution on the GPCs 250 of the PPU 200. The tasks are allocated to a particular TPC 320 within a GPC 250 and, if the task is associated with a shader program, the task may be allocated to an SM 340. A scheduler unit 410 receives the tasks from the compute work distribution unit 225 and the graphics primitive distribution unit 230 and manages instruction scheduling for one or more groups of threads (i.e., warps) assigned to the SM 340. Each SM 340 may include K scheduler units 410 (i.e., 410(0) . . . 410(K-1)). The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register the 420 is divided between the different warps being executed by the SM 340. The register file 420 provides temporary storage for operands connected to the data paths of the functional units.

Each SM 340 comprises L processing cores 450 (i.e., 450(0) . . . 450(L-1)). In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 (i.e., 452(0) . . . 452(M-1)) that perform special functions (e.g., pixel blending operations, and the like), and N LSUs 454 (i.e., 454(0) . . . 454(N-1)) that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SVC) along with one or more other logic units such as a reduced instruction set computer (RISC) CPU, a memory management unit (MMU), a digital-to-analog converter (DAC), and the like.

In one embodiment, the 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in h chipset (i.e., Northbridge) of the motherboard.

Simultaneous Graphics and Compute

Figure 5A:
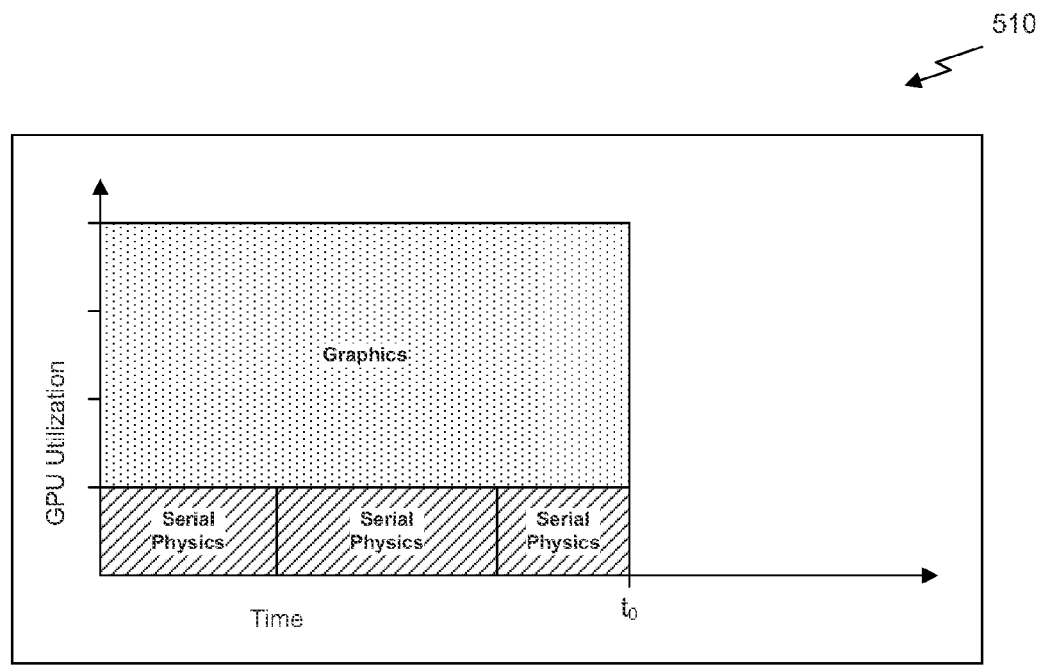
FIG. 5A is a chart that illustrates processor utilization as a function of time where graphics tasks and physics tasks are processed in parallel using a fixed allocation of processor resources, in accordance with the prior art.

FIG. 5A is a chart 510 that illustrates processor utilization as a function of time where graphics tasks and physics tasks are processed in parallel using a fixed allocation of processor resources, in accordance with the prior art. As shown in FIG. 5A, the chart 510 shows time on an independent axis and GPU utilization on a dependent axis. In certain applications, such as in games that generate graphics from a 3D model, graphics tasks and physics tasks may be processed in parallel by a GPU. However, each of the physics tasks may be processed serially by a portion of the GPU while each of the graphics tasks is processed serially by a separate portion of the GPU. In one example, the graphics tasks may be processed by the first portion of the GPU to generate image data for display of a next frame while physics tasks are processed by a second portion of the GPU to calculate values for modifying a model associated with a subsequent frame displayed after the next frame. Therefore the physics tasks are associated with a subsequent graphics task that is executed after the physics tasks have completed and, potentially, in parallel with other physics tasks related to another subsequent frame.

As shown in FIG. 5A, an application may process a single graphics frame in parallel with three serially processed physics tasks. A first portion of the GPU is allocated to the graphics tasks and a second portion of the GPU is allocated to the physics tasks. The multiple physics tasks processed serially by the second portion of the GPU could potentially be processed in parallel as long as each physics task is independent of the others. As shown in FIG. 5A, three serial physics tasks are defined, each physics task being independent of the other physics tasks. The GPU could alternately be configured to process each of the three physics tasks in parallel during a first portion of time using all of the resources of the GPU, and then switch processor contexts to process the graphics tasks during a second portion of time using all of the resources of the GPU. However, it will be appreciated that each of the physics tasks may be different than the other physics tasks. For example, one physics task may include more or fewer instructions than the other physics tasks. Such application specific details may mean that a portion of the GPU remains under-utilized when the GPU is configured to perform time-multiplexed context switching.

Figure 5B:
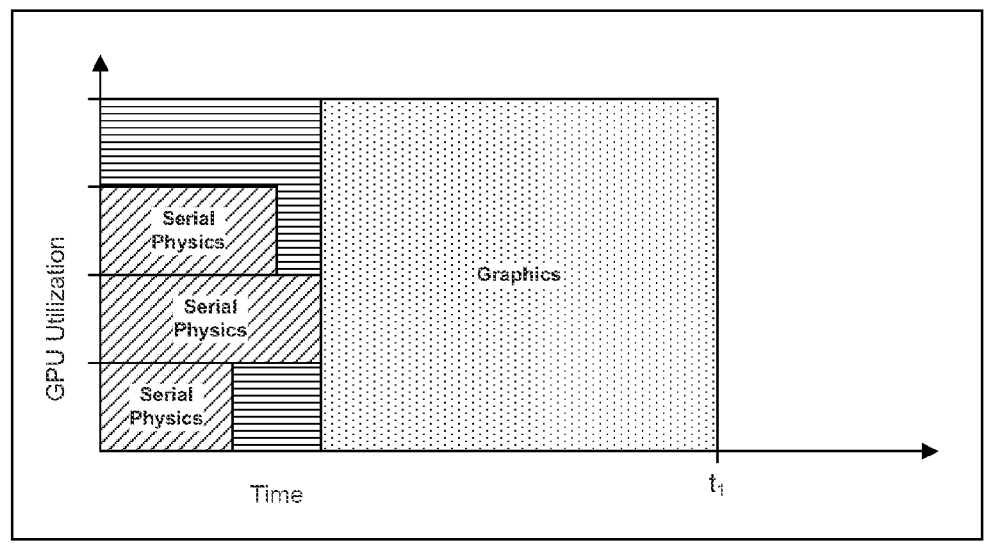
FIG. 5B is a chart that illustrates processor utilization as a function of time where graphics tasks and physics tasks are processed using time-multiplexed context switching, in accordance with the prior art.

FIG. 5B is a chart 520 that illustrates processor utilization as a function of time where graphics tasks and physics tasks are processed using time-multiplexed context switching, in accordance with the prior art. As shown in FIG. 5B, a first context may be loaded onto the GPU that enables multiple physics tasks to be processed in parallel during a first portion of time. It will be appreciated that application specific details of the physics tasks may not be able to use the resources of the GPU efficiently. For example, the physics tasks may not be configurable to use 100% of the GPU resources. In addition, some physics tasks may have more instructions than others such that a particular physics task takes longer to execute than other physics tasks. It will be appreciated that even if each physics task is the same as the other physics tasks, execution of the physics tasks may not take the same amount of time when variable latency operations are performed. For example, memory operations may take longer to complete for some tasks than others due to other clients requesting memory access asynchronously.

Once at least one physics task has completed execution, the GPU resources allocated to that task may be idle while the other physics tasks associated with the context are allowed to finish execution. The GPU may not be allowed to switch contexts to process the graphics tasks until all of the physics tasks have completed execution. Therefore, by the time all of the physics tasks have completed and the physics context is swapped with a graphics context, some inefficiency in execution will have occurred such that the graphics task cannot be completed by the time $t_0$. In other words, the time $t_1$ to complete the same number of tasks in FIG. 5B may be greater than the time $t_0$ as shown in FIG. 5A.

As FIGS. 5A and 5B show, a processor that is configured to time slice using different contexts to execute physics tasks and graphics tasks serially in order to emulate a processor that can execute physics tasks and graphics tasks in parallel may not be as efficient. Furthermore, a processor that is configured to execute graphics tasks and physics tasks in parallel using fixed portions of the processor limits all of the available resources to be used for one task or the other if either a graphics pipeline or a compute pipeline is idle. Therefore, the architectures of FIGS. 5A and 5B are not ideal.

Figure 6A:
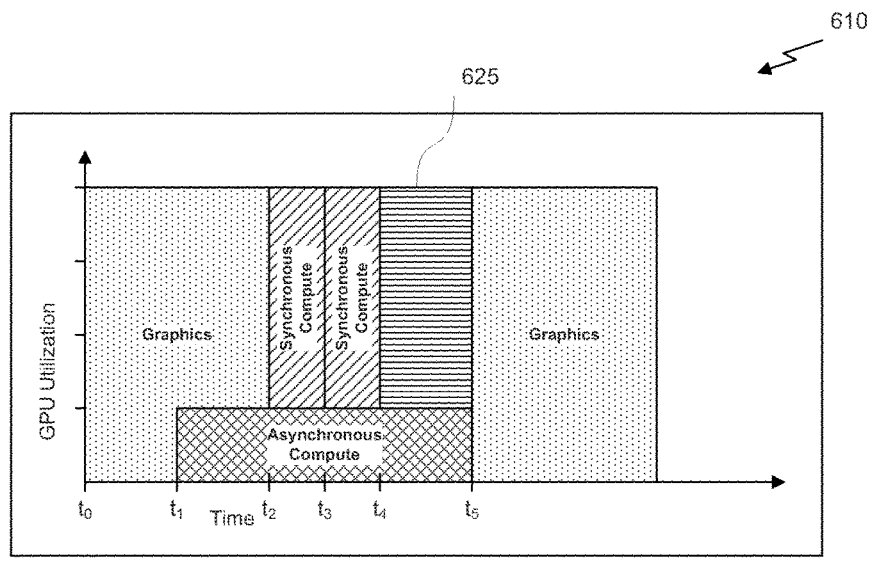
FIG. 6A is a chart that illustrates processor utilization as a function of time, such processor configured to dynamically allocate processor resources between a graphics pipeline and a compute pipeline, in accordance with one embodiment.

FIG. 6A is a chart 610 that illustrates processor utilization as a function of time, such processor configured to dynamically allocate processor resources between a graphics pipeline and a compute pipeline, in accordance with one embodiment. In one embodiment, a processor, such as PPU 200, may be configured to process tasks associated with multiple channels within a single processor context. As shown in FIG. 6A, graphics tasks and synchronous compute tasks may be associated with a first channel (i.e., a synchronous channel) and asynchronous compute tasks may be associated with a second channel (i.e., an asynchronous channel). In the context of the present description, graphics tasks are tasks associated with generating graphics data for display on a display device, synchronous compute tasks are tasks associated with generating data that is subsequently utilized by a subsequent graphics task or dependent upon a prior graphics task, and asynchronous compute tasks are tasks that generate data that is independent of any of the tasks in the synchronous compute channel. In other words, the synchronous compute tasks are ordered with respect to the graphics tasks and other synchronous compute tasks included in the synchronous channel. In contrast, the asynchronous compute tasks included in the asynchronous channel may be executed in any order with respect to the graphics tasks and/or synchronous compute tasks of the synchronous channel.

In one embodiment, a processor may be dynamically configured to process tasks from multiple channels in the some processor context. As shown, at an initial time, $t_0$, all of the available resources of the processor may be allocated to process a first graphics task associated with a synchronous channel. While the processor is processing the first graphics task, an asynchronous compute task associated with an asynchronous channel may be received by the processor. In order to process the asynchronous compute task in parallel with the first graphics task, the processor may be configured to allocate a portion of the processor's resources to process the asynchronous compute task while a remaining portion of the processor's resources continue to process the graphics task. Consequently, at a first time, $t_1$, and without switching contexts, the processor is reconfigured to process the graphics task and the asynchronous compute task in parallel.

The graphics task may complete execution at a second time, $t_2$, at which point the next task associated with the synchronous channel may be executed. In this example, the next task in the synchronous channel may be a first synchronous compute task. The graphics pipeline is idle at this time, so the processor may be configured to allocate all of the processor's resources to process the compute tasks (both asynchronous and synchronous). At a third time, $t_3$, the first synchronous compute task may complete execution and a second synchronous compute task associated with the synchronous channel may be executed. The second synchronous compute task may be dependent on the first synchronous compute task, which is why the first and second synchronous compute tasks are not processed in parallel. At a fourth time, $t_4$, the second synchronous compute task may complete execution. However, at the fourth time, $t_4$, the asynchronous compute task may still be executing. In one embodiment, in order to ensure that the previous graphics task and any compute tasks have finished execution, the processor may execute a wait-for-idle (WFI) command that generates a signal when all processor resources are idle and indicates that the next graphics task can be executed. The WFI command was implemented to ensure that one graphics task finished executing before the next graphics task was scheduled for execution, performing synchronization between graphics tasks to reduce the occurrence of image artifacts in image data generated for display. Consequently, a portion 625 of the processor may be underutilized while the asynchronous compute task finishes execution. Only once all tasks have finished execution at a fifth time, $t_5$, will the WFI command enable the processor's resources to be allocated to the graphics pipeline and a second graphics task to start execution. It will be appreciated that the WFI command causes the tasks to be executed in a manner that is not as efficient as possible given that the portion 625 of the processor is not fully utilized.

Figure 6B:
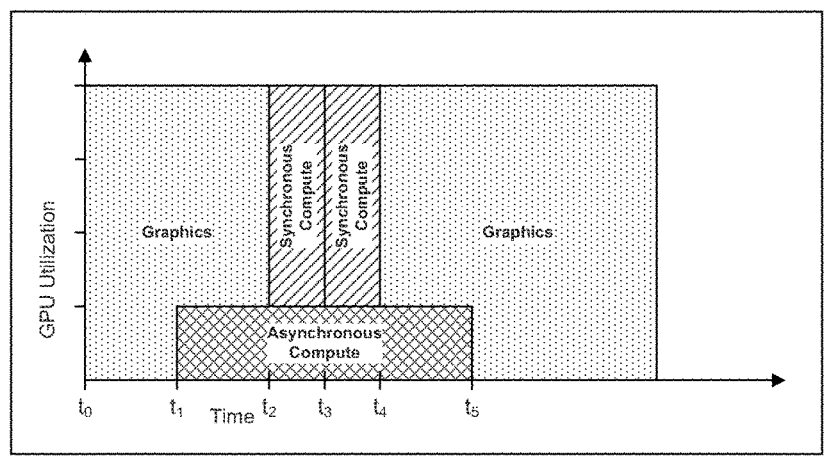
FIG. 6B is a chart that illustrates processor utilization as a function of time, such processor configured to dynamically allocate processor resources between a graphics pipeline and a compute pipeline, in accordance with another embodiment.

FIG. 6B is a chart 620 that illustrates processor utilization as a function of time, such processor configured to dynamically allocate processor resources between a graphics pipeline and a compute pipeline, in accordance with another embodiment. In order to process graphics tasks and compute tasks simultaneously, a channel specific WET command may be implemented that, for example, enables the next task from the synchronous channel to begin execution even if one or more tasks from the asynchronous channel have not finished execution. The channel specific WFI command, as illustrated, waits for the synchronous compute tasks to complete, but does not wait for the asynchronous compute tasks to complete.

As shown in FIG. 6B, the second graphics task may begin execution at the time $t_4$ even though the asynchronous compute task has not finished execution because a synchronous-channel only WFI command may enable a portion of the processor's resources to be configured to process the second graphics task. In other words, once the second synchronous compute task has finished execution, a synchronous channel WFI command may enable the second graphics task to begin execution on a portion of the processor resources even though all of the processor resources are not idle. It will be appreciated that, by implementing channel specific WFI commands in order to synchronize tasks associated with a particular channel, the portion 625 of the processor that was underutilized in FIG. 6A is utilized more efficiently.

In another embodiment, class specific WFI commands may be implemented. As shown in FIG. 6B, the graphics tasks and synchronous compute tasks are both associated with the synchronous channel while the graphics task is processed by the graphics pipeline and the synchronous compute tasks are processed by the compute pipeline. Thus, a channel-specific WFI command could not be completed until the graphics pipeline was cleared of all graphics tasks and the compute pipeline was drained of all synchronous compute tasks associated with the synchronous channel (while asynchronous compute tasks could still be executed in the compute pipeline). Therefore, class-specific WFI commands may be implemented instead of channel specific WFI commands, where a class refers to both a channel and a type of task (e.g., graphics tasks and synchronous compute tasks would be associated with separate and distinct WFI commands). In this case, a graphics WFI command may be issued prior to time $t_2$ in order to signal the completion of the first graphics task. After the graphics WFI command has executed, the processor may reallocate processor resources from the graphics pipeline to the compute pipeline in order to process the synchronous compute tasks. Similarly, a synchronous compute WFI command may be issued prior to time $t_4$ in order to signal the completion of the second synchronous compute tasks. After the synchronous compute WFI command has executed, the processor may reallocate processor resources from the compute pipeline to the graphics pipeline in order to process the second graphics task even though the asynchronous compute task has not finished executing.

Figure 7:
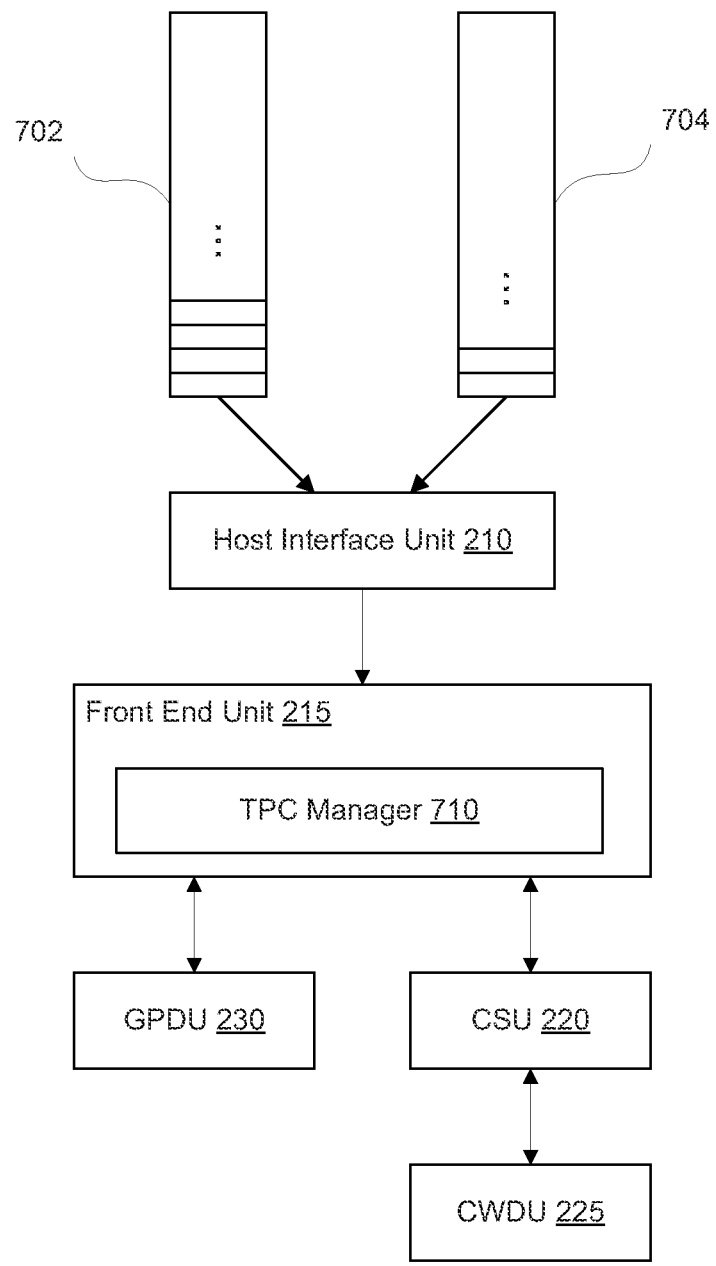
FIG. 7 illustrates a portion of the parallel processing unit of FIG. 2 configured to process graphics tasks and compute tasks substantially simultaneously, in accordance with one embodiment.

FIG. 7 illustrates a portion of the PPU 200 of FIG. 2 configured to process graphics tasks and compute tasks substantially simultaneously, in accordance with one embodiment. As shown in FIG. 7, the front end unit 215 includes a TPC manager 710. The TPC manager 710 is configured to implement a protocol for dynamically allocating processing units to process tasks associated with either a graphics pipeline or a compute pipeline based on the tasks scheduled for execution in the PPU 200. The PPU 200 receives tasks in two channels, a synchronous channel 702 and an asynchronous channel 704. As used herein a task is defined as a sequence of instructions that cause the PPU 200 to process some data. Tasks may be related to graphics operations or compute operations. The synchronous channel 702 includes tasks for both the graphics pipeline and the compute pipeline. These tasks must be executed serially because one task may be dependent on the execution of a previously received task. The asynchronous channel 704 includes tasks for the compute pipeline that may be executed asynchronously with the tasks received on the synchronous channel 702. In one embodiment, the synchronous channel 702 and the asynchronous channel 704 are data structures such as a FIFO or circular buffers implemented in a memory such as memory 204.

In another embodiment, the asynchronous channel 704 can be replaced with a plurality of asynchronous channels. The tasks in each asynchronous channel should be independent from each other, such that they can be scheduled in parallel and in any order. The host interface unit 210 selects tasks from the head of each channel that contains work for the single processor context and transmits the tasks to the front end unit 215. In one embodiment, all the tasks in the synchronous channel 702 and the one or more asynchronous channels 704 originate from a single processor context. A context, as used herein, refers to a set of tasks that share the same virtual memory map and other processor and operating system resources. In an alternate embodiment, the tasks in the synchronous channel 702 and the one or more asynchronous channels 704 originate from multiple processor contexts. One asynchronous channel could be dedicated to each processor context such that the workload for a single processor context is ordered. The host interface unit 210 selects tasks from the head of each channel that contains work for multiple processor contexts and transmits the tasks to the front end unit 215. In this manner, the PPU 200 may be dynamically configured to execute graphics and compute work from multiple processor contexts simultaneously on the TPCs 320.

As described above, the host interface unit 210 is configured to retrieve the tasks from the synchronous channel 702 and the asynchronous channel 704. In one embodiment, the host interface unit 210 retrieves tasks from one of the synchronous channel 702 or the asynchronous channel 704 until a special yield instruction is reached in the channel. When the yield instruction is reached, the host interface unit 210 is configured to switch channels and retrieve tasks from the other channel. Yield instructions may be inserted by the device driver for the PPU 200 at places that are ideal for switching between the channels, such as between tasks inserted in a particular channel. In another embodiment, the host interface unit 210 may be configured to switch between channels automatically, such as at the conclusion of every task or after a specified period of time. In yet another embodiment, the host interface unit 210 may be configured to process tasks in one channel until there are no tasks remaining in that particular channel and then process tasks in another channel. For example, the host interface unit 210 may be configured to process all tasks in the synchronous channel 702. Once the tasks have been processed from the synchronous channel 702 and no tasks remain in the synchronous channel 702, the host interface unit 210 may process any tasks included in the asynchronous channel 704.

The host interface unit 210 transmits the tasks to the front end unit 215. The front end unit 215 includes a TPC manager 710 that is configured to allocate TPCs 320 to either the compute pipeline or the graphics pipeline depending on the type of tasks being transmitted to the front end unit 215 by the host interface unit 210. In one embodiment, when the host interface unit 210 switches channels (e.g., in response to a yield instruction), the host interface unit 210 transmits a message to the front end unit 215 that indicates which channel the host interface unit 210 is currently processing. The message may be, e.g., 32 bits of data having one or more fields, at least one field indicating whether the current channel is the synchronous channel 702 or the asynchronous channel 704. In one embodiment, the message includes a 1-bit field that indicates a Simultaneous Compute Graphics Type (SCG_Type) indicating whether the current channel is the synchronous channel 702 or the asynchronous channel 704. In other embodiments, the message may include a field with a plurality of bits (e.g., 5-bits) for encoding an identifier for each channel in a plurality of channels (e.g., up to 32 channels).

The TPC manager 710 tracks the configuration of all TPCs 310 in the PPU 200. Each TPC 310 may be allocated to the graphics pipeline, the compute pipeline, or in transition between the graphics pipeline and the compute pipeline. The TPC manager 710 communicates with the compute work distribution unit 225 to determine how many TPCs 310 are needed to process compute tasks. The TPC manager 710 also communicates with the scheduling units for the graphics pipeline (i.e., the graphics primitive distribution unit 230 and the MPCs 330 of the various TPCs 320) in order to transition a particular TPC 310 from the graphics pipeline to the compute pipeline or from the compute pipeline to the graphics pipeline.

In one embodiment, the PPU 200 implements at least one graphics pipeline and at least one compute pipeline. Each of the pipelines may be implemented using one or more of the units within the GPCs 250. For example, compute tasks associated with the compute pipeline are received by the front end unit 215 and transmitted to the compute scheduler unit 220, which then passes tasks that are ready to be executed by at least one TPC 310 onto the compute work distribution unit 225. The compute work distribution unit 225 then forwards the tasks to the GPCs 250 allocated to process each task. Each of the tasks associated with the graphics pipeline are processed in a similar fashion. The graphics tasks are received by the front end unit 215 and transmitted to the graphics primitive distribution unit 230, which then forwards the tasks to the GPCs 250 allocated to process each task.

Figure 8:
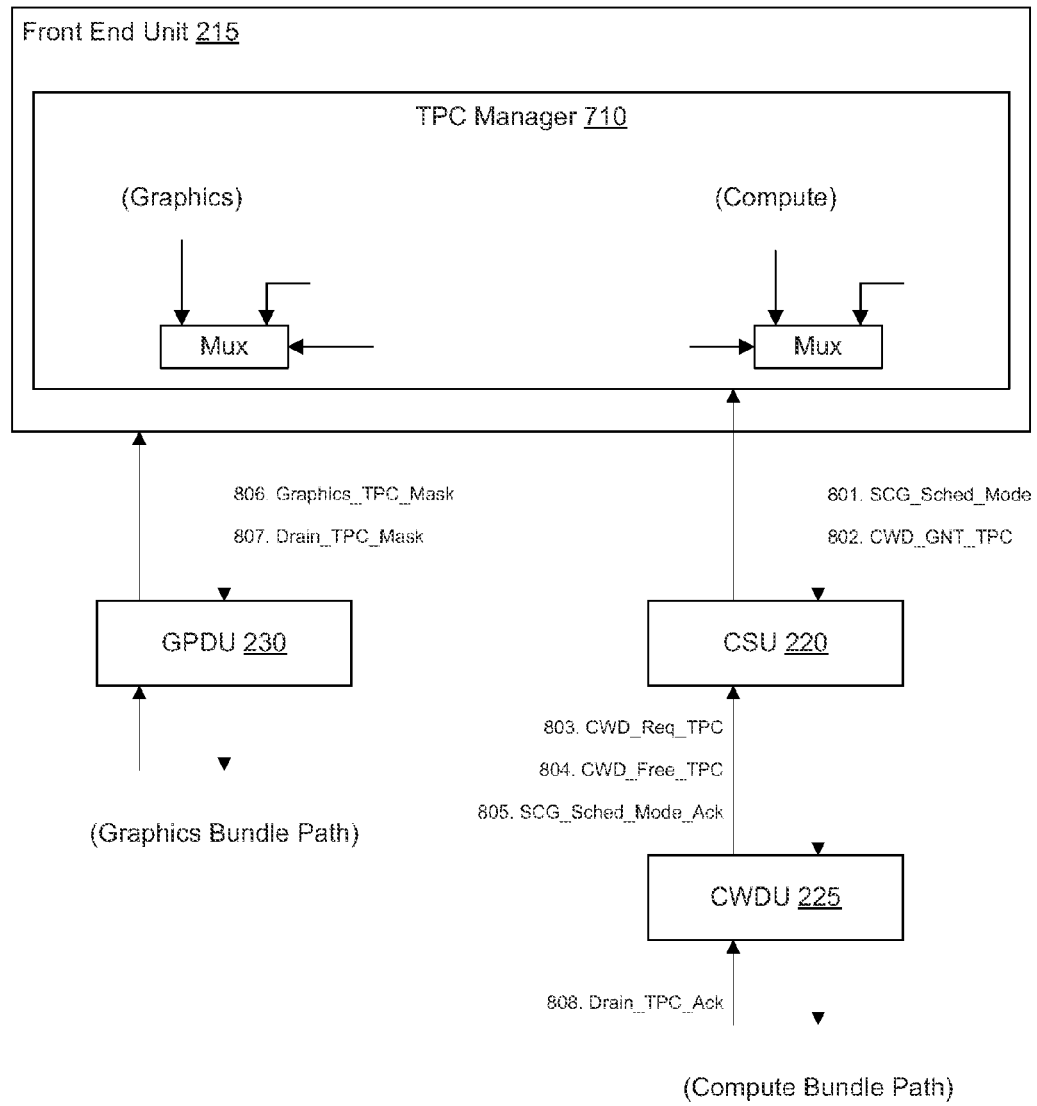
FIG. 8 illustrates a protocol for managing the allocation of texture processing clusters between a synchronous channel and an asynchronous channel, in accordance with one embodiment.

FIG. 8 illustrates a protocol for managing the allocation of TPCs 310 between a graphics pipeline and a compute pipeline, in accordance with one embodiment. As shown in FIG. 8, the TPC Manager 710 includes a number of multiplexors that enable the TPC manager 710 to insert packets (i.e., bundles) into the data path for graphics data and/or compute data. As discussed above, compute tasks are handled by the compute scheduler unit 220 and the compute work distribution unit 225, which manage the allocation of tasks to the resources of the PPU 200 allocated to the compute pipeline. Graphics tasks are handled by the graphics primitive distribution unit 230, which manages the allocation of tasks to the resources of the PPU 200 allocated to the graphics pipeline.

Compute tasks cause the SMs 340 within the TPCs 320 to load instructions and data into on-chip memory, process the data based on the instructions, and store results out to memory 204. Each compute task may define a large number of threads for processing large sets of data in parallel. In contrast, a graphics task may include instructions for processing graphics data. In the case of 3D rendering, the graphics task may cause the front end unit 215 to configure one or more TPCs 320 to implement at least a portion of a 3D graphics pipeline. Once the graphics pipeline is set up, bundles of 3D graphics instructions and state information are received by the front end unit 215. In other words, the synchronous channel 702 will include instructions that specify pointers to buffers of vertex data in the memory 204 and pointers to shader programs to process the vertex data. These commands are read from the synchronous channel 702 by the host interface unit 210 and forwarded to the front end unit 215. The front end unit 215 recognizes these bundles as graphics bundles and instead of forwarding these bundles to the compute scheduler unit 220, the bundles are transmitted to the graphics primitive distribution unit 230. The graphics primitive distribution unit 230 fetches the vertex data from the memory 204 for the graphics primitives and groups the vertex data into batches of primitives that are distributed to the GPCs 250 for processing. Again, processing may involve one or more of executing a vertex shader, a tessellation shader, or a geometry shader on the SMs 340 as well as performing fixed function operations such as clipping, culling, and viewport transform in the primitive engines 335. The primitive data is then rasterized into pixels by the raster engine 325. The pixels are then processed by pixel shaders on the SMs 340 and the ROPs 350 to produce color data for display.

The protocol implemented by the TPC manager 710 enables the compute work distribution unit 225 to request TPCs 320 as needed to process the compute tasks received from the compute scheduler unit 220. In one embodiment, the compute pipeline has priority over the graphics pipeline when requesting the allocation of TPCs 320 by the TPC manager 710 in the front end unit 215. The protocol also enables the compute work distribution unit 225 to release TPCs 320 to the TPC manager 710 such that those TPCs 320 can be allocated to process graphics tasks in the graphics pipeline.

In one embodiment, the protocol is configured such that the TPC manager 710 starts operating in a Mixed operations mode on startup or whenever a new processor context is created. The Mixed operations mode enables each of the TPCs 320 in the PPU 200 to be allocated to either the graphics pipeline or the compute pipeline. The TPC manager 710 can default so that all of the TPCs 320 are initially allocated to the graphics pipeline. Once the TPC Manager 710 is running, the compute work distribution unit 225 makes requests to the TPC Manager 710 whenever the compute work distribution unit 225 needs TPCs 320 to process compute tasks. In one embodiment, the compute work distribution unit 225 may specify the exact TPC 320 to be allocated for compute tasks. By being able to specify the exact TPC 320, the compute work distribution unit 225 may be able to make certain optimizations, such as local memory throttling, system connectivity (e.g., sending compute tasks to two or more TPCs 320 in the same GPC 250), and other types of optimizations based on the architecture of the PPU 200 and/or the specific applications being executed.

When the TPC Manager 710 receives a request to allocate one or more TPCs 320 to process compute tasks, the TPC Manager 710 may perform certain actions to ensure that the TPCs 320 are finished processing previous graphics work. In other words, graphics work may have been submitted to the graphics pipeline prior to the TPC Manager 710 receiving the request from the compute work distribution unit 225. This graphics work should be allowed to drain through the graphics pipeline prior to the TPCs 320 being reallocated. The TPC Manager 710 sends a message to the graphics primitive distribution unit 230 to disallow future graphics tasks from being scheduled on the TPCs 320 being transitioned from the graphics pipeline to the compute pipeline. The TPC Manager 710 also sends a message to the MPC(s) 330 for each of the TPCs 320 that are being transitioned from the graphics pipeline to the compute pipeline. These messages or packets are inserted at the top of the graphics pipeline and reconfigure the graphics primitive distribution unit 230 such that no more graphics work is launched down the graphics pipeline to be processed by those TPCs 320. When the MPC 330 receives the message, all previously submitted graphics work will have been received by that TPC 320. After receiving the message, the MPC 330 waits until the TPC 320 has finished processing the graphics work previously received and then sends an acknowledge message back to the TPC Manager 710 that the TPC 320 is safe to be reallocated. Once the TPC Manager 710 has received the acknowledge message, the TPC Manager 710 transmits a message to the compute work distribution unit 225 that indicates that the TPCs 320 have been allocated to the compute pipeline. The compute work distribution unit 225 may then start transmitting compute tasks to those TPCs 320.

The compute work distribution unit 225 can then transmit asynchronous compute tasks and synchronous compute tasks to the TPCs 320 allocated to the compute pipeline, and the graphics primitive distribution unit 230 can transmit synchronous graphics tasks to the TPCs 320 allocated to the graphics pipeline. In one embodiment, the compute tasks take priority over the graphics tasks, so, in some instances, the compute work distribution unit 225 may request that all of the TPCs 320 be allocated to the compute pipeline thereby stalling any pending graphics tasks. Once the compute tasks have finished executing, then the TPCs 320 may be freed in order to process the stalled graphics tasks. It will be appreciated that the compute work distribution unit 225 may implement any type of algorithm/logic for determining how many TPCs 320 should be requested for one or more given compute tasks. The number of requested TPCs 320 may be dependent on a structure of the compute task, such as a number of threads included in the compute task. The number of requested TPCs 320 may also be dependent on the system architecture in order to implement certain optimizations such as by attempting to locate TPCs 320 allocated to a particular pipeline within the same GPC 250 as much as possible. In another embodiment, the number of TPCs 320 requested is equal to or greater than the number of pending compute tasks, with each compute task being allocated to a different TPC 320.

Once the compute work distribution unit 225 has finished processing a compute task on a given TPC 320, the compute work distribution unit 225 may free that TPC to be allocated back to the graphics pipeline. In order to free a TPC 320, the compute work distribution unit 225 simply stops sending work from any pending compute tasks to the TPC 320. Once the TPC 320 is idle, the corresponding MPC 330 of the TPC 320 will transmit an acknowledge message to the compute work distribution unit 225 indicating that the work is complete. Then, the compute work distribution unit 225 transmits a request to the TPC Manager 710 to free that TPC 320. When the TPC Manager 710 receives the request to free the TPC 320, the TPC Manager 710 can immediately allocate that TPC 320 to the graphics pipeline and inform the graphics primitive distribution unit 230 that the TPC 320 is now allocated to the graphics pipeline. Unlike the case where a TPC 320 transitions from the graphics pipeline to the compute pipeline and the TPC Manager 710 is required to ensure that all graphics work has been drained from the TPC 320 before the TPC 320 can be reallocated, when the TPC 320 transitions from the compute pipeline to the graphics pipeline, the TPC 320 is already idle by the time the TPC Manager 710 receives the request to free the TPC 320.

In one embodiment, the TPC Manager 710 may detect certain conditions exist and switch into an All-Compute operations mode. In the All-Compute operations mode, all of the TPCs 320 are allocated to the compute pipeline. In this mode, the compute work distribution unit 225 does not have to request TPCs 320 from the TPC Manager 710 and wait for the TPC Manager 710 to respond once TPCs 320 have been drained of graphics work and allocated to the compute pipeline. The All-Compute operations mode can be initiated when the graphics pipeline is known to be idle (e.g., the graphics pipeline has never received any work from the synchronous channel 702, a graphics-only WFI command was just executed, etc.) and the compute pipeline is not currently idle. If these conditions are met, then the TPC Manager 710 may switch into the All-Compute operations mode and send a message to the compute work distribution unit 225 that indicates that the TPC Manager 710 is in the All-Compute operations mode. It will be appreciated that once the compute work distribution unit 225 has received the message indicating that the TPC Manager 710 is in the All-Compute operations mode, then the compute work distribution unit 225 should no longer request TPCs 320 be allocated to process compute tasks nor should the compute work distribution unit 225 attempt to free the TPCs 320 to process graphics tasks when the TPCs 320 have completed the work associated with the compute tasks.

When the TPC Manager 710 is operating in the All-Compute operations mode, then the front end unit 215 must monitor any data received from the host interface unit 210. If any data arrives that is associated with the graphics pipeline, then the TPC Manager 710 should block such data from being transmitted to the graphics primitive distribution unit 230 until the TPC Manager 710 has transitioned back into the Mixed operations mode and has allocated at least one TPC 320 to process graphics tasks.

In some embodiments, it may be possible that a minimum number of TPCs 320 are required to implement at least a portion of the graphics pipeline. However, in the Mixed operations mode, the compute work distribution unit 225 may request so many TPCs 320 to handle the pending compute tasks that there are not enough TPCs 320 left to implement the graphics pipeline. In this case, the TPC Manager 710 asserts a signal that causes the front end unit 215 to generate a graphics-only WFI command to drain the rest of the pending graphics work from the graphics pipeline. Once the TPCs 320 associated with the graphics pipeline are idle, then the TPC Manager 710 can allocate all of the TPCs 320 to the compute pipeline and transition to the All-Compute operations mode. In one implementation, the graphics pipeline cannot be implemented unless at least one TPC 320 per GPC 250 is allocated to the graphics pipeline.

It will be appreciated that the protocol requires the compute work distribution unit 225 to request TPCs 320 be allocated to the compute pipeline when the compute workload has increased. However, while the compute work distribution unit 225 is waiting for a response from the TPC Manager 710, the compute work distribution unit 225 may continue to insert compute tasks into the compute pipeline using the previous set of TPCs 320 allocated to the compute pipeline. In other words, the compute pipeline does not have to be idled while the compute work distribution unit 225 is waiting for a response for more TPCs 320 to be allocated to the compute pipeline.

Returning to FIG. 8, the TPC Manager 710 includes a plurality of multiplexors that enable the TPC Manager 710 to insert data packets into the various pipelines implemented by the PPU 220. As shown, data packets associated with a graphics pipeline are forwarded to the graphics primitive distribution unit 230. The graphics primitive distribution unit 230 forwards the data packets onto the correct TPCs 320 based on the configuration of the graphics pipeline. Data packets associated with the compute pipeline are forwarded to the compute scheduler unit 220 and then onto the compute work distribution unit 225 where they are forwarded to the correct TPCs 320.

FIG. 8 also shows the various messages associated with the protocol implemented by the TPC Manager 710 and the particular paths that the messages are transmitted on or received from. For example, when the TPC Manager 710 is first initialized, the TPC Manager 710 generates an SCG_Sched_Mode packet 801 and transmits the packet on the compute pipeline to the compute work distribution unit 225.

In one embodiment, the SCG_Sched_Mode packet 801 indicates which scheduling mode the TPC Manager 710 is operating in. Once the compute work distribution unit 225 receives the SCG_Sched_Mode packet 801, the compute work distribution unit 225 generates an SCG_Sched_Mode_Ack packet 805 to acknowledge that the SCG_Sched_Mode packet 801 was received. The SCG_Sched_Mode_Ack packet 805 is transmitted back to the TPC Manager 710 via the compute pipeline. In one embodiment, the SCG_Sched_Mode packet 801 includes a header that indicates the packet type and a bit that indicates whether the TPC Manager 710 is operating in the Mixed mode or the All-Compute mode.

When the TPC Manager 710 is operating in Mixed mode and the compute work distribution unit 225 needs to request one or more additional TPCs 320 be allocated to the compute pipeline, the compute work distribution unit 225 generates a CWD_Req_TPC packet 803 and transmits the packet to the TPC Manager 710 via the compute pipeline. The CWD_Req_TPC packet 803 includes a header that indicates the packet type and a mask that indicates which TPCs 320 the compute work distribution unit 225 is requesting to be allocated to the compute pipeline. In an alternative embodiment, the CWD_Req_TPC packet 803 may specify the requested TPCs 320 in another manner. For example, each CWD_Req_TPC packet 803 could only specify a single TPC 320 per request and identify that TPC 320 using a unique identifier rather than a mask.

As described above, when the TPC Manager 710 receives the CWD_Req_TPC packet 803, the TPC Manager 710 needs to drain the pending graphics work from the requested TPCs 320 before the TPCs 320 can be allocated to the compute pipeline. In order to drain the graphics work from the TPCs 320 the TPC Manager 710 prevents any additional graphics work from being launched on the corresponding graphics pipeline and inserts a Graphics_TPC_Mask packet 806 on the graphics pipeline. The Graphics_TPC_Mask packet 806 includes a header and a mask that indicates which TPCs 320 are allocated to the graphics pipeline. This packet prevents any subsequent graphics work from being scheduled on a TPC 320 that was allocated to the graphics pipeline but is being transitioned to the compute pipeline. Then, the TPC Manager 710 inserts a Drain_TPC_Mask packet 807 into the graphics pipeline. This packet includes a header as well as a logical identifier for the GPC and TPC that specifies exactly one TPC 320 that should be drained. If multiple TPCs 320 need to be drained, then additional Drain_TPC_Mask packets 807 should be inserted into the graphics pipeline. Eventually, each of the Drain_TPC_Mask packets 807 reach the corresponding MPC 330 included in the TPC 320 identified by the packet. Once the MPC 330 receives the Drain_TPC_Mask packet 807, all graphics work is known to have reached the TPC 320 and once the work in the TPC 320 has been complete and the TPC 320 is idle, then the TPC 320 can be reallocated to the compute pipeline. The MPCs 330 will send a Drain_TPC_Ack packet 808 back to the TPC Manager 710 via the compute pipeline. The Drain_TPC_Ack packet 808 may contain a header as well as the same logical identifiers for the GPC and TPC included in the Drain_TPC_Mask packet 807. Once the TPC Manager 710 has received the Drain_TPC_Ack packet 808, all prior graphics work has been processed by the requested TPCs 320 and the TPC Manager 710 may generate a CWD_Gnt_TPC packet 802 to transmit to the compute work distribution unit 225 via the compute pipeline. The CWD_Gnt_TPC packet 802 includes a header and a mask that indicates which TPCs 320 are allocated to the graphics pipeline and which TPCs 320 are allocated to the compute pipeline. Once the compute work distribution unit 225 has received the CWD_Gnt_TPC packet 802, the compute work distribution unit 225 may begin scheduling work from compute tasks on the reallocated TPCs 320.

Once the compute work has been completed, the compute work distribution unit 225 may free the TPCs 320 to be returned to the graphics pipeline. In order to free the TPCs 320, the compute work distribution unit 225 transmits a CWD_Free_TPC packet 804 to the TPC Manager 710. The CWD_Free_TPC packet 804 includes a header and a mask that indicates which TPCs 320 are to be freed to be reallocated to the graphics pipeline. Once the compute work distribution unit 225 has freed the TPCs 320, the TPC Manager 710 transmits a Graphics_TPC_Mask packet 806 to the graphics primitive distribution unit 230. The Graphics_TPC_Mask packet 806 includes a header and a mask that indicates which TPCs 320 are allocated to the graphics pipeline.

It will be appreciated that, as used herein, a packet, message, or bundle is a term for data including a number of fields. The data may comprise a number of bits. In one embodiment, the packets are 32 bits. In alternative embodiments, the packets may be any size.

Figure 9A:
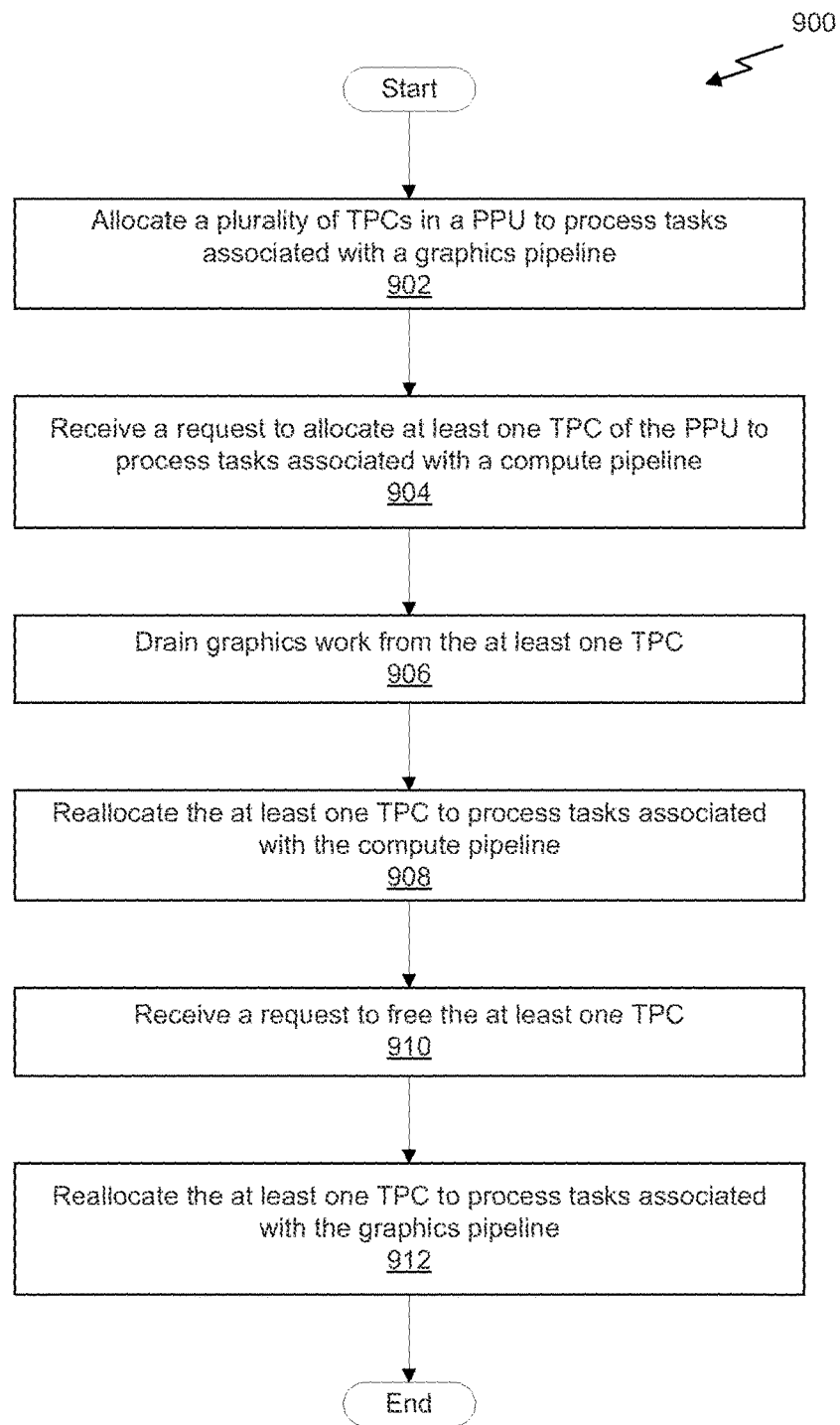
FIG. 9A illustrates a flowchart of a method for dynamic allocation of texture processing clusters, in accordance with one embodiment.

FIG. 9A illustrates a flowchart of a method 900 for dynamic allocation of TPCs 320, in accordance with one embodiment. At step 902, a plurality of TPCs 320 in the PPU 200 are allocated by the TPC Manager 710 to process tasks associated with a graphics pipeline. In one embodiment, the TPC Manager 710 is initialized such that all TPCs 320 in the PPU 200 are allocated to the graphics pipeline. The TPC Manager 710 generates a SCG_Sched_Mode packet 801 and transmits the packet to the compute work distribution unit 225 via the compute pipeline to configure the compute scheduler unit 220 to run in the Mixed operations mode. The TPC Manager 710 generates a Graphics_TPC_Mask packet 806 and transmits the packet to the graphics primitive distribution unit 230 via the graphics pipeline to allocate all of the TPCs 320 to the graphics pipeline. At step 904, the TPC Manager 710 receives a request to allocate at least one TPC 320 of the PPU 200 to process tasks associated with a compute pipeline. In one embodiment, the compute work distribution unit 225 transmits a CWD_Req_TPC packet 803 to the TPC Manager 710 in response to receiving scheduled compute tasks from the compute scheduler unit 220.

At step 906, in response to the request, the TPC Manager 710 drains graphics work from the at least one TPC 320. In one embodiment, the TPC Manager 710 generates a Graphics_TPC_Mask packet 806 to prevent at least one TPC 320 from receiving any more graphics work and at least one Drain_TPC_Mask packet 807 corresponding to each TPC 320 to be reallocated from the graphics pipeline to the compute pipeline. Once the TPC Manager 710 receives a Drain_TPC_Ack packet 808 on the compute pipeline acknowledgement return path for each of the Drain_TPC_Mask packets 807 transmitted on the graphics pipeline, the graphics work has drained from the at least one TPC 320.

At step 908, the TPC Manager 710 reallocates the at least one TPC 320 to process tasks associated with the compute pipeline. In one embodiment, the TPC Manager 710 transmits a CWD_Gnt_TPC packet 802 to the compute work distribution unit 225 via the compute pipeline in order to reallocate the at least one TPC 320 to the compute pipeline. The compute work distribution unit 225 may then implement at least a portion of the compute pipeline using the at least one TPC 320.

At step 910, the TPC Manager 710 receives a request to free the at least one TPC 320 allocated to process tasks associated with the compute pipeline. In one embodiment, when the compute work distribution unit 225 determines that there is no pending compute work to schedule on the at least one TPC 320, the compute work distribution unit 225 transmits a CWD_Free_TPC packet 804 to the TPC Manager 710 via the compute pipeline acknowledgement return path in order to indicate that the at least one TPC 320 can be reallocated to process tasks associated with the graphics pipeline.

At step 912, the TPC Manager 710 reallocates the at least one TPC 320 to process tasks associated with the graphics pipeline. In one embodiment, the TPC Manager 710 transmits a new Graphics_TPC_Mask packet 806 to the graphics primitive distribution unit 230 that indicates that the at least one TPC 320 is now allocated to process tasks associated with the graphics pipeline.

Figure 9B:
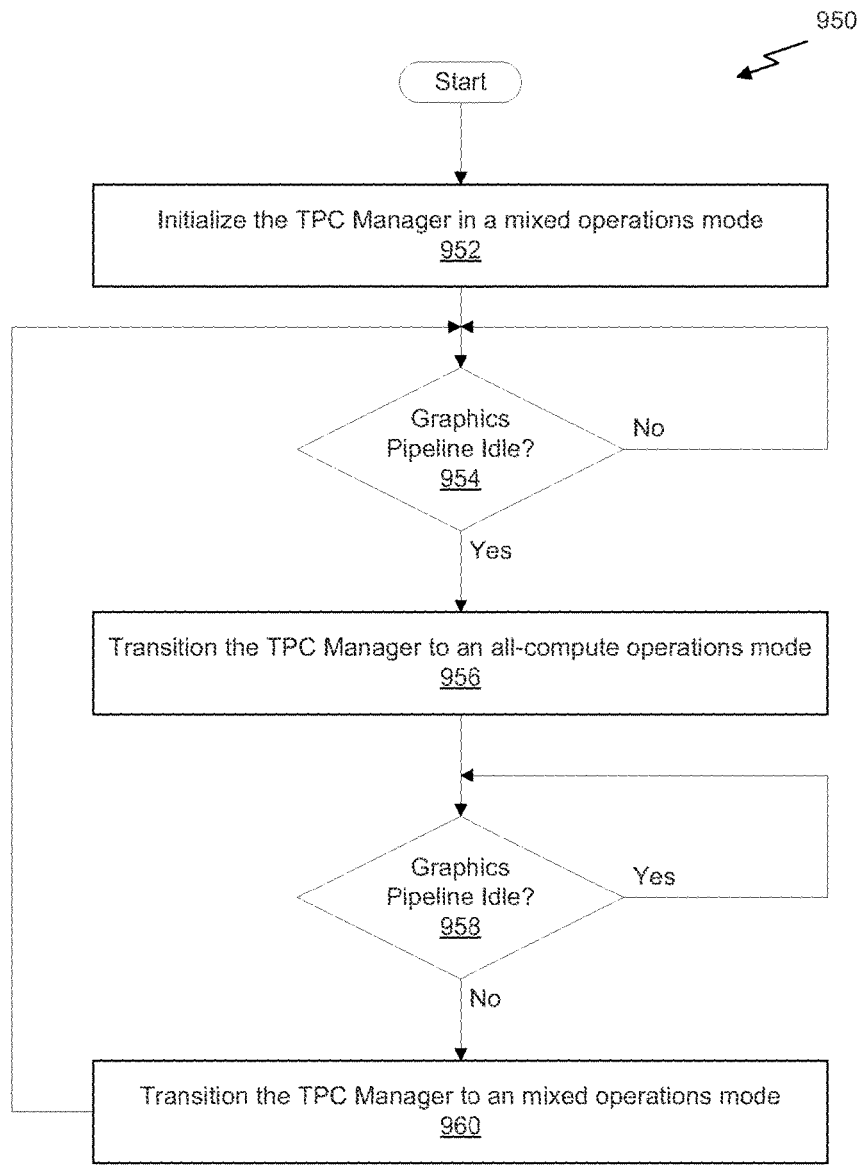
FIG. 9B illustrates a flowchart of a method for changing the operation mode of the parallel processing unit, in accordance with one embodiment.

FIG. 9B illustrates a flowchart of a method 950 for changing the operation mode of the PPU 200, in accordance with one embodiment. At step 952, the TPC Manager 710 is initialized in a Mixed operations mode. In one embodiment, the TPC Manager 710 defaults in the Mixed operations mode, where all of the TPCs 320 are initially allocated to process tasks associated with a graphics pipeline. The TPC Manager 710 may transmit a SCG_Sched_Mode packet 801 to the compute work distribution unit 225 to indicate the current operating mode of the TPC Manager 710, and a Graphics_TPC_Mask packet 806 to the graphics primitive distribution unit 230 to allocate all TPCs 320 to the graphics pipeline. Once the TPC Manager 710 receives a SCG_Sched_Mode_Ack packet 805 from the compute work distribution unit 225, the TPC Manager 710 may unblock the graphics pipeline and the compute pipeline to enable tasks to be processed by the corresponding pipeline.

At step 954, the TPC Manager 710 determines whether the graphics pipeline is idle. In one embodiment, special circumstances may indicate that the graphics pipeline is idle, such as immediate after a graphics-only WFI command has been executed and no graphics tasks have been received by the front end unit 215 from the host interface unit 210. If the graphics pipeline is not idle, then the TPC Manager 710 remains in the Mixed operations mode. However, if the graphics pipeline is idle, then, at step 956, the TPC Manager 710 may transition to an All-Compute operations mode. In one embodiment, the TPC Manager 710 transmits a SCG_Sched_Mode packet 801 to the compute work distribution unit 225 to indicate the current operating mode is the All-Compute operations mode. The compute work distribution unit 225 will immediately send an SCG_Sched_Mode_Ack packet 805 back to the TPC Manager 710. In the All-Compute operations mode, the compute work distribution unit 225 does not need to explicitly request allocation and deallocation of TPCs 320 to process tasks associated with the compute pipeline.

At step 958, the TPC Manager 710 determines whether the graphics pipeline is idle. If the graphics pipeline is idle, then the TPC Manager 710 remains in the All-Compute operations mode. However, if the graphics pipeline is not idle (i.e., there are now pending graphics tasks that have been received from the host interface unit 210), then, at step 960, the TPC Manager 710 may transition back to the Mixed operations mode. In one embodiment, the TPC Manager 710 transmits a SCG_Sched_Mode packet 801 to the compute work distribution unit 225 to indicate the current operating mode is the Mixed operations mode. The compute work distribution unit 225 will immediately send an SCG_Sched- _Mode_Ack packet 805 back to the TPC Manager 710. However, the graphics pipeline cannot be unblocked yet because the TPC Manager 710 believes that all TPCs 320 are still allocated to the compute pipeline. The compute work distribution unit 225 also immediately checks if any TPCs 320 allocated to the compute pipeline are idle, either due to no work ever being issued to that TPC 320 or because the MPC 330 has replied that all prior issued work have completed execution. If any TPCs 320 are idle, then the compute work distribution unit 225 transmits a CWD_Free_TPC packet 804 to the TPC Manager 710 to release the idle TPCs 320 to be allocated back to the graphics pipeline. Once the TPC Manager 710 detects that enough TPCs 320 have been released by the compute work distribution unit 225, then the TPC Manager 710 may unblock the graphics pipeline and send a Graphics_TPC_Mask packet 806 to the graphics primitive distribution unit 230 that includes a mask that indicates which TPCs 320 are allocated to the graphics pipeline. After step 960, the method 950 returns to step 954 and waits for the graphics pipeline to become idle again such that the TPC Manager 710 can return to the All-Compute operations mode.

Figure 10:
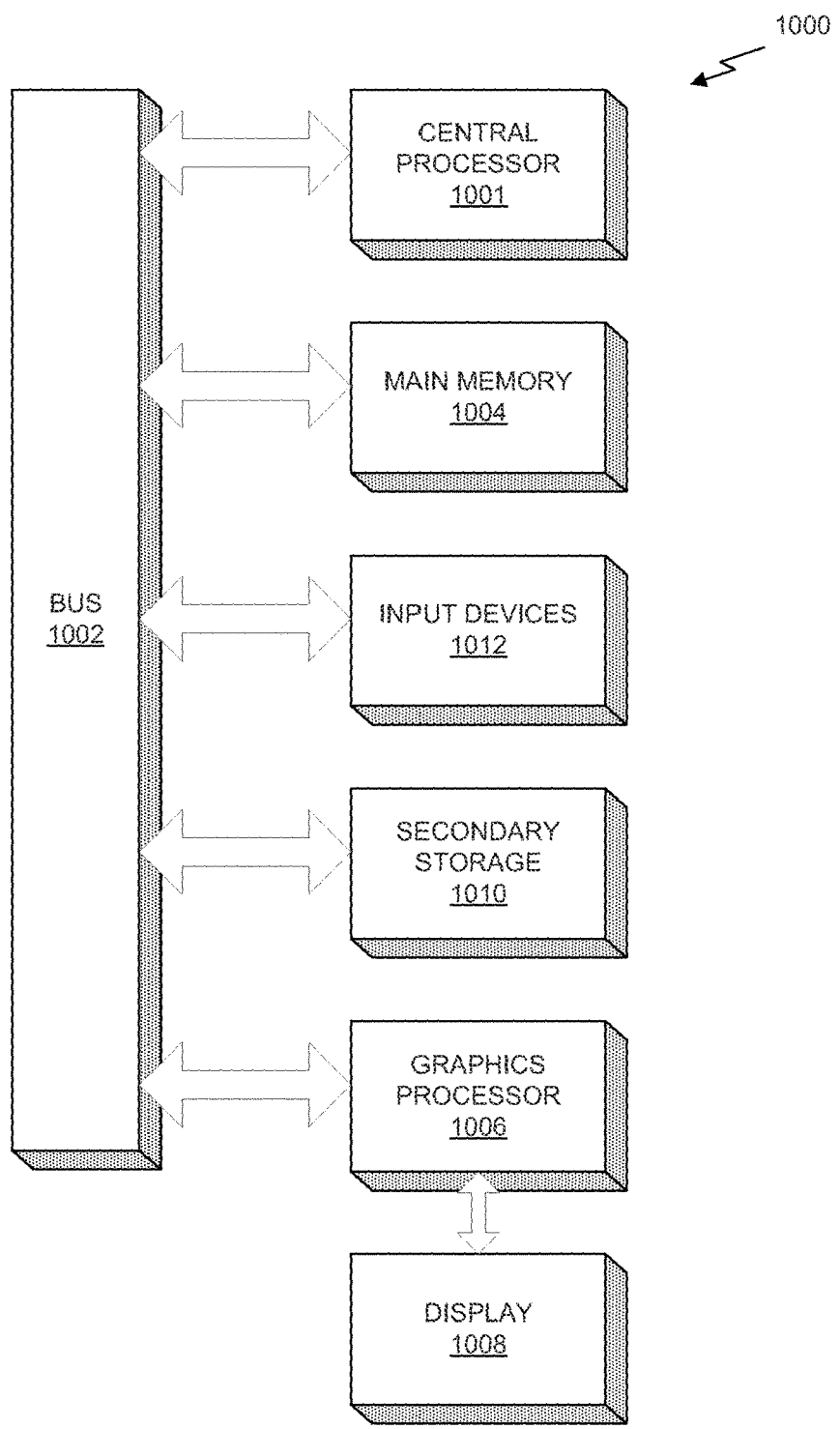
FIG. 10 illustrates an exemplary system in which the various architecture and/or functionality of the various previous embodiments may be implemented.

FIG. 10 illustrates an exemplary system 1000 in which the various architect and/or functionality of the various previous embodiments may be implemented. As shown, a system 1000 is provided including at least one central processor 1001 that is connected to a communication bus 1002. The communication bus 1002 may be implemented using any suitable protocol, such as PCI (Peripheral Component Interconnect), PCI-Express, AGP (Accelerated Graphics Port), HyperTransport, or any other bus or point-to-point communication protocol(s). The system 1000 also includes a main memory 1004. Control logic (software) and data are stored in the main memory 1004 which may take the form of random access memory (RAM).

The system 1000 also includes input devices 1012, a graphics processor 1006, and a display 1008, i.e. a conventional CRT (cathode ray tube), LCD (liquid crystal display), LED (light emitting diode), plasma display or the like. User input may be received from the input devices 1012, e.g., keyboard, mouse, touchpad, microphone, and the like. In one embodiment, the graphics processor 1006 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1004 and/or the secondary storage 1010. Such computer programs, when executed, enable the system 1000 to perform various functions. The memory 1004, the storage 1010, and/or any other storage are possible examples of computer-readable media.

In one embodiment, the architecture and/or functionality of the various previous figures may be implemented in the context of the central processor 1001, the graphics processor 1006, an integrated circuit (not shown) that is capable of at least a portion of the capabilities of both the central processor 1001 and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   allocating a plurality of processing units included in a parallel processor to process tasks associated with a graphics pipeline, wherein the plurality of processing units includes a first processing unit and additional processing units;
   receiving, at a processing cluster manager included in the parallel processor, a request to allocate the first processing unit to process tasks associated with a compute pipeline;
   transmitting a first packet to a work distribution unit that indicates the first processing unit is requested for allocation to the compute pipeline;
   reallocating the first processing unit to process tasks associated with the compute pipeline; and
   simultaneously executing the tasks associated with the graphics pipeline and the tasks associated with the compute pipeline, wherein the tasks associated with the compute pipeline are executed by the first processing unit and the tasks associated with the graphics pipeline are executed by the additional processing units.

2. The method of claim 1, further comprising receiving a stream of commands associated with a processor context, wherein the stream of commands includes a plurality of channels including a synchronous channel and an asynchronous channel.

3. The method of claim 2, wherein each task includes an identifier that indicates a particular channel in the plurality of channels associated with the task.

4. The method of claim 1, wherein each processing unit in the plurality of processing units comprises at least one streaming multiprocessor configured to execute a plurality of threads in parallel.

5. The method of claim 1, further comprising transmitting a second packet to the work distribution unit that indicates a mode of operation for the plurality of processing units, wherein the mode of operation indicates one of a mixed operations mode or an all-compute operations mode.

6. The method of claim 5, further comprising:
detecting that the graphics pipeline is idle; and
transmitting a third packet to the work distribution unit to transition to the all-compute operations mode.

7. The method of claim 6, further comprising:
receiving a task associated with the graphics pipeline; and
transmitting a fourth packet to the work distribution unit to transition to the mixed operations mode.

8. The method of claim 1, wherein the request includes a mask having a number of bits equal to a number of processing units included in the plurality of processing units, each bit in the mask indicating whether a corresponding processing unit should be allocated to the compute pipeline or the graphics pipeline.

9. The method of claim 1, wherein the work distribution unit is configured to generate the request based on a number of scheduled tasks associated with the compute pipeline.

10. The method of claim 1, further comprising, in response to the request, causing any pending graphics tasks to be drained from the at least one processing unit.

11. The method of claim 1, further comprising:
executing a wait-for-idle (WFI) command that is associated with a channel and a type of task in the channel; and
receiving an indication that all tasks of the type associated with the WFI command previously launched on a corresponding pipeline have been completed.

12. The method of claim 1, wherein the tasks are associated with two or more processor contexts.

13. A method, comprising:
allocating a plurality of processing units included in a parallel processor to process tasks associated with a graphics pipeline, wherein the plurality of processing units includes a first processing unit and additional processing units;
receiving, at a processing cluster manager included in the parallel processor, a first request to allocate the first processing unit to process tasks associated with a compute pipeline;
reallocating the first processing unit to process tasks associated with the compute pipeline,
simultaneously executing the tasks associated with the graphics pipeline and the tasks associated with the compute pipeline, wherein the tasks associated with the compute pipeline are executed by the first processing unit and the tasks associated with the graphics pipeline are executed by the additional processing units;
receiving a second request to free the first processing unit; and
in response to receiving the second request, reallocating the first processing unit to process tasks associated with the graphics pipeline.

14. A non-transitory computer-readable storage medium storing instructions that, when executed by a processor, cause the processor to perform steps comprising
allocating a plurality of processing units included in a parallel processor to process tasks associated with a graphics pipeline, wherein the plurality of processing units includes a first processing unit and additional processing units;
receiving, at a processing cluster manager included in the parallel processor, a request to allocate the first processing unit to process tasks associated with a compute pipeline;
transmitting a packet to a work distribution unit that indicates the first processing unit is requested for allocation to the compute pipeline;
reallocating the first processing unit to process tasks associated with the compute pipeline; and
simultaneously executing the tasks associated with the graphics pipeline and the tasks associated with the compute pipeline, wherein the tasks associated with the compute pipeline are executed by the first processing unit and the tasks associated with the graphics pipeline are executed by the additional processing units.

15. A system comprising:
a parallel processor including:
a plurality of processing units, and
a processing cluster manager coupled to the plurality of processing units and configured to:
allocate the plurality of processing units to process tasks associated with a graphics pipeline, wherein the plurality of processing units includes a first processing unit and additional processing units;
receive a request to allocate the first processing unit to process tasks associated with a compute pipeline,
transmit a packet to a work distribution unit that indicates the first processing unit is requested for allocation to the compute pipeline, and
reallocate the first processing unit to process tasks associated with the compute pipeline, wherein the tasks associated with the compute pipeline are executed by the first processing unit and the tasks associated with the graphics pipeline are simultaneously executed by the additional processing units.

16. The system of claim 15, further comprising a host unit coupled to the processing cluster manager and configured to receive a stream of commands associated with a processor context, wherein the stream of commands includes a plurality of channels including a synchronous channel and one or more asynchronous channels.

17. The system of claim 15, further comprising a host interface unit that is configured to execute a wait-for-idle (WFI) command associated with a channel and a type of task in the channel and receive an indication that all tasks of the type associated with the WFI command previously launched on a corresponding pipeline have been completed.

18. The system of claim 15, wherein the tasks are associated with two or more processor contexts.

19. A system, comprising:
a parallel processor including:
a plurality of processing units, and
a processing cluster manager coupled to the plurality of processing units and configured to:
allocate the plurality of processing units to process tasks associated with a graphics pipeline, wherein the plurality of processing units includes a first processing unit and additional processing units;
receive a first request to allocate the first processing unit to process tasks associated with a compute pipeline, reallocate the first processing unit to process tasks associated with the compute pipeline, wherein the tasks associated with the compute pipeline are executed by the first processing unit and the tasks associated with the graphics pipeline are simultaneously executed by the additional processing units, receive a second request to free the first processing unit; and in response to receiving the second request, reallocate the first processing unit to process tasks associated with the graphics pipeline.

* * * * *

UNITED STATES PATENT AND TRADEMARK OFFICE
CERTIFICATE OF CORRECTION

PATENT NO. : 10,217,183 B2
APPLICATION NO. : 14/137818
DATED : February 26, 2019
INVENTOR(S) : Gregory S. Palmer et al.

Page 1 of 1

It is certified that error appears in the above-identified patent and that said Letters Patent is hereby corrected as shown below:

In the Specification

Column 5, Line 61 please replace "a vertex Shader," with --a Vertex Shader,--;
Column 9, Line 40 please replace "register the 420" with --register file 420--;
Column 11, Line 1 please replace "(SVC) along" with --(SoC) along--;
Column 11, Line 6 please replace "the 200" with --the PPU 200--;
Column 11, Line 13 please replace "included in h" with --included in the--;
Column 12, Line 64 please replace "some processor context." with --same processor context.--;
Column 13, Line 52 please replace "specific WET command" with --specific WFI command--;
Column 23, Line 24 please replace "various architect" with --various architecture--;
Column 24, Line 15 please replace "circuit hoard system," with --circuit board system,--.

In the Claims

Column 26, Line 55 please replace "A system, comprising:" with --A system comprising:--.

Signed and Sealed this
Twenty-fifth Day of February, 2020

Andrei Iancu
*Director of the United States Patent and Trademark Office*